United States Patent

Armstrong

[15] 3,650,286
[45] Mar. 21, 1972

[54] HYDRAULIC SELECTOR VALVE
[72] Inventor: George B. Armstrong, Claremont, Calif.
[73] Assignee: The United States Government as represented by the Administrator of the Federal Aviation Administration
[22] Filed: May 13, 1970
[21] Appl. No.: 36,745

[52] U.S. Cl. ..........................137/87, 137/494, 137/99, 137/497, 137/625.63
[51] Int. Cl. ..........................................G05d 16/10
[58] Field of Search...........137/87, 494, 118, 114, 109, 137/99, 497, 486, 625.63, 595, 597

[56] References Cited

UNITED STATES PATENTS 3,406,702  10/1968  Jenney......................137/87
3,429,328  2/1969  Morris.......................137/118

Primary Examiner—Samuel B. Rothberg
Assistant Examiner—William H. Wright
Attorney—Glenn Orlob and Kenneth W. Thomas

[57] ABSTRACT

An automatic pressure responsive selector valve for automatically supplying pressure from three independent hydraulic systems, one of which is maintained in a standby status, into two working systems such that in the event of a failure of one of the supply systems the selector valve activates the standby system into a working system; and upon the further failure of a second supply system, the selector valve divides the fluid flow from the remaining pressurized system into the two working systems.

5 Claims, 2 Drawing Figures

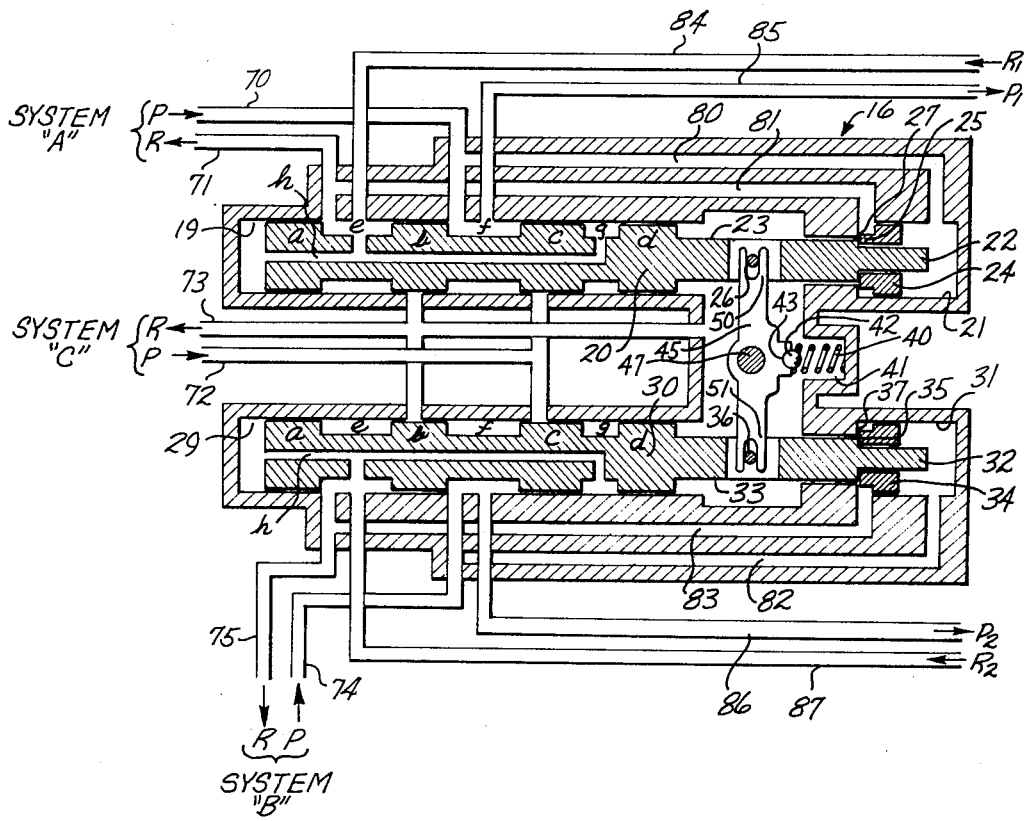

PATENTED MAR 21 1972 3,650,286

INVENTOR.
GEORGE B. ARMSTRONG

BY

AGENT

HYDRAULIC SELECTOR VALVE

The invention described and claimed herein resulted from work done under United States Government Contract FA-SS-67-3, and the United States Government has an irrevocable, nonexclusive license to practice and have practiced the invention claimed herein, including the unlimited right to sublicense others to practice and have practiced the claimed invention for any purpose whatsoever.

SUMMARY OF THE INVENTION

The invention relates to a selector valve mechanism for automatically supplying pressurized fluid from a multiredundant hydraulic supply system into two hydraulic working systems at any time that the pressure in either one of the two working systems decreases below a required level and further includes an additional embodiment which will, in the event of a failure of a second supply system, furnish pressure from the remaining hydraulic system into both working systems.

BRIEF DESCRIPTION OF THE DRAWINGS

FIG. 1 is a functional and schematic illustration of an automatic pressure responsive dual valve selector mechanism embodying the invention.

FIG. 2 is a functional and schematic illustration of an additional embodiment of another pressure positioned spool added to the dual selector valve shown in FIG. 1 for an automatic pressure responsive trivalve selector mechanism.

DESCRIPTION OF THE PREFERRED EMBODIMENTS

Referring now to FIG. 1, this automatic pressure responsive dual valve fluid flow selector device as depicted in the drawing shows the position of the valve elements in their normal operating position wherein all three independent hydraulic supply systems A, B and C are operatively supplying their required fluid pressurization to the dual valve. System A pressure inlet line 70 and return line 71 are ported to spool valve 20 slideably disposed in the cylindrical opening 19 of the dual valve body 16. System B pressure inlet line 74 and return line 75 are ported to spool valve 30 slideably disposed in the cylindrical opening 29 of the dual valve body 16. System C pressure inlet line 72 and return line 73 are ported to both spool valves 20 and 30.

The spool valve 20 is maintained in the position shown by the system A pressure through inlet line 70 and branch passage 80 entering cylindrical chamber 21 and acting against the face of centering spool 24 which is slideably disposed on spool valve extension rod 22 and forces the centering spool 24 against the radial shoulder 25, between the spool valve shaft 23 and the extension rod 22, to move the spool valve 20 to the left until the centering spool 24 strikes the abutment 27 of the cylindrical chamber 21. The spool valve 20 which comprises: cylindrical lands 20a, 20b, 20c and 20d; axially spaced cylindrical recesses or grooves 20e, 20f, and 20g between the lands; internal passage h vented to return; and is maintained in the position shown by system A pressure holding centering spool 24 against its stops 25 and 27; allows the system A pressure entering inlet line 70 to be ported to the cylindrical recess or annular fluid chamber 20f and exiting from there through pressure line 85 for supplying the first working system. The system A return line 71 is ported to the cylindrical recess or annular fluid chamber 20e and from there picks up the return fluid flow from the first working system through line 84.

The spool valve 30, which is similar to spool valve 20, is maintained in the position shown by the system B pressurized fluid flowing through inlet line 74 and branch passage 82, to enter cylindrical chamber 31 and act against the face of centering spool 34 which is slideably disposed on spool valve extension rod 32. This forces the centering spool 34 against the radial shoulder 35, which is formed by the difference in diameters of the spool valve shaft 33 and the extension rod 32, to move the spool valve 30 to the left until the centering spool 34 strikes the abutment 37 of the cylindrical chamber 31. The spool valve 30 comprises: cylindrical lands 30a, 30b, 30c and 30d; axially spaced cylindrical recesses or grooves 30e, 30f, and 30g between the lands forming annular fluid chambers; and internal passage h vented to return. The spool valve 30 is maintained in the depicted position by the pressure in system B acting to hold centering spool 34 against its stops 35 and 37. This allows the system B pressure entering inlet line 74 to be ported to the annular fluid chamber 30f and exit from there through pressure line 86 for supplying the second working system. The system B return line is ported to annular fluid chamber 30e and from there picks up the return fluid flow from the second working system through line 87.

Supply system C pressure through inlet line 72, which is ported to both spool valves 20 and 30, is blocked by the lands 20c and 30c respectively; and the system C return flow through line 75, which is also ported to both spool valves 20 and 30, is blocked by the lands 20b and 30b respectively. Therefore, system C, with the spool valves 20 and 30 in the position shown, is inactivated from supplying either of the two working systems and in effect becomes the standby system.

Interposed between the dual spool valves 20 and 30 which are slideably disposed in cylindrical openings 19 and 29 respectively of the dual valve body 16 which houses the spool valves in a substantially parallel relationship, is a lever member or link 45 which is pivotally supported by pin 47 in the dual valve body or housing 16. The bifurcated or forked ends 50 and 51 of link 45 straddle the pins 26 and 36 respectively, which pins are supported across slotted openings in the valve spool shafts 23 and 33 respectively and pivotal movement of the link 45 controls the position of the spool valves 20 and 30 respectively. The pivotal movement of link 45 is restained to some extent by centering means comprising; a helical spring 40 having one end bearing against the inner bottom of a cup-shaped cylindrical opening 41, formed within an interconnecting section between the spool valves 20 and 30 of the dual valve body or housing 16, and the other end of spring 40 is disposed about or encircles a ball 42 partially housed within a hemispherical recess 43 of the link 45 and also bears against a flat rim of the recess 43 for imparting a centering or restraining force against pivotal movement of the link 45 about pivot pin 47.

If the independent hydraulic system A fluid pressure, supplying the first working system through the spool valve 20, decreases below an acceptable level, the system A pressure acting against the face of the centering spool 24 and the axial end face area of extension rod 22, will be overpowered by the independent hydraulic system B fluid pressure applied to the axial end face area of extension rod 32. This pressure applied to the rod end face area, as determined by its diameter, forces the spool valve 30 to the left to bottom or abut the end closure of cylindrical chamber 29, and through the pivotally connecting link member 45 causes movement of the other spool valve 20 in the opposite direction or to the right. This movement of spool valve 20 to the right causes the pressure inlet and return lines, 70 and 71 respectively, to be cut off by lands 20a and 20b of spool valve 20 and thereby cease to supply the first working system with pressurized fluid. At the same time, the annular fluid chambers 20e and 20f are positioned in alignment with the return and inlet lines 73 and 72, respectively, of the inactive or standby system C, and also in alignment with the respective return and inlet lines 84 and 85 of the first working system, thereby activating system C into supply the pressurized fluid directly to the first working system. System B will continue to supply pressurized fluid to the second working system because the movement of spool valve 32 to the left did not alter the interconnecting relationship.

If the fluid pressure in system A returns to the desired level, the fluid pressure acting on face area of centering spool 24, which area is relatively greater than that of axial end face area of extension rod 32, will return the dual valves to their previously described normal operating position as depicted in the drawing, and system A will again be directly supplying the pressurized fluid to the first working system and system C will be deactivated and return to its standby status.

Similarly, if system B had failed, the dual valves would have shifted in the other direction, thereby supplying the second working system with pressurized fluid directly from the activated standby system C.

Further, in the event of a second supply system pressure failure, the dual valves will not shift in order that the one remaining good pressure supply system will continue to supply the working system it was serving before the event of the second failure.

The level of fluid pressure, in either of the initial supply systems A OR B, at which the dual valves will switch to activate the standby supply system into one of the working systems, is determined to some extent by the restrained pivotal movement of link 45 by the centering means but to a greater degree by the relationship of the face areas of the centering spools 24 and 34 to the axial face areas of the extension rods 22 and 32.

By a predetermined variation in the selection of these four areas or their diameters, the dual selector valve can be made to switch the standby system into the first working system at a different fluid pressure than it will switch the standby system into the second working system. Also, if it is desirable to do so, it will be apparent from this structure that further variations in the selections of these four areas can be made for additional modifications.

Referring now to FIG. 2, as a further embodiment, by the addition of another fluid pressure responsive selector spool valve to the dual valve system, the remaining good fluid pressurized independent hydraulic supply system, after the failure of a second supply system, can be made to furnish pressurized fluid to both of the working systems when coupled thereto downstream thereof. In coupling the pressure balanced spool valve 60, which is slideably disposed in cylindrical opening 61 of the valve body or housing 59, to the dual valve system for an automatic pressure responsive trivalve selector mechanism, the fluid pressure supply system flow to the first working system through pressure and return lines 85 and 84 respectively, is routed from the dual valve directly to the third spool valve 60 bypassing the first working system which is now positioned downstream of the third spool valve 60 and tied into the system to receive the flow from the three independent hydraulic supply systems A, B and C after the combined dual and added third valve or the trivalve. Also, the fluid pressure supply system flow to the second working system through pressure and return lines 86 and 87, respectively, is routed from the dual valve directly to the third spool valve 60 and the second working system supply flow is received from the trivalve.

With fluid pressure available to the dual selector valve shown in FIG. 1 by any two or all three independent hydraulic supply systems A, B, or C, the modified or trivalve operates exactly as before the modification or addition of the third spool valve 60 in that the spool valve 60 is maintained in the position shown in FIG. 2 by the supply system pressurized fluid flow from the dual valve of FIG. 1 through inlet line 85 and branch passage 88 entering cylindrical chamber 63, coaxially formed at one end of the cylindrical opening 61 occupied by spool valve 60, and acting against the face of centering spool 64 which is slideably disposed on spool valve extension rod 62. This forces the centering spool 64 against the radial shoulder 95, formed by the difference in diameters of the spool valve 60 and the extension rod 62, to move the spool valve 60 until the centering spool 64 strikes the abutment 97 of the cylindrical chamber 63. Also, the supply system pressurized fluid flow from the dual valve through the other inlet line 86 and branch passage 89 enters the cylindrical chamber 65 coaxially formed at the other end of the cylindrical opening 61 and acts against the face of centering spool 68 which is slideably disposed on spool valve extension rod 66. This forces the centering spool 68 against the radial shoulder 96 moving the spool valve 60 until the centering spool 68 strikes the abutment 98 of the cylindrical chamber 65. The spool valve 60 comprises: cylindrical lands $60a$, $60b$, $60c$, $60d$ and $60e$; axially spaced cylindrical recesses or grooves $60f$, $60g$, $60h$ and $60i$ between the lands forming annular fluid chambers. The spool valve 60 is maintained in the position shown in FIG. 2 by the pressurized fluid flow balance between the two supply systems from the dual valve acting on opposite ends of the spool valve 60 opposing one another to hold the centering spools 64 and 68 against their stops 95, 97 and 96, 98 respectively. This allows the system pressure entering inlet line 85 to be ported to the annular fluid chamber $60h$ and exit from there through pressure line 100 for supplying the first working system coupled downstream thereof; the system fluid return line 84 is ported to the annular fluid chamber $60f$ and from there picks up the return fluid flow from the first working system through line 102. Also, the other system pressure enters inlet line 86 and is ported to annular chamber $60i$ to exit from there through pressure line 101 for supplying the second working system coupled downstream thereof; the system return line 87 being ported to annular chamber $60g$ and from there picking up the return fluid flow from the second working system through line 103. Therefore, it will be evident that any two operative pressure supply systems from the dual selector valve directed to the third valve will remain unchanged in their independently supplying the two working systems.

If pressure is lost in any two of the three systems A, B, and C, then pressure will be lost on either centering spool 64 or 68 and the fluid pressure from the remaining system will be applied to one end of the added third valve spool 60 causing it to shift and deliver the remaining system's pressure into both of the downstream working systems. Referring to FIG. 2, if pressure is lost in inlet line 85, which through branch line 88 pressurizes the chamber 63 and holds the centering spool 64 against its stops, then the pressure in the opposite chamber 65 applied to the axial end face area of extension rod 66 will force the spool valve 60 to bottom or abut the end closure of the opposite chamber 63 thereby causing the fluid flow inlet and return lines, 85 and 84, to be cut off by lands $60d$ and $60b$ of spool valve 60 from supplying the first working system. Further, the annular fluid chambers $60i$ and $60g$ are positioned in alignment with the pressure and return lines 86 and 87 respectively of the remaining pressurized supply system; and also in alignment with the respective pressure and return inlet lines of the first working system 100 and 102, and in addition with the respective pressure and return inlet lines of the second working system thereby coupling the operating requirements of both working systems to the same remaining operative pressure supply system. Had the pressure been lost in the other pressure system supplying the third valve, the valve spool 60 would have moved in the opposite direction and cut off the failed supply system; and at the same time, supplied the two working systems downstream of the third valve with pressurized fluid from the remaining operative supply system. At all times, the working system's return flow is routed back to the system which is supplying the pressure flow.

If the fluid pressure in the failed system supplying the third valve returns to the desired level, the fluid pressure in the chambers 63 and 65, acting on the face area of their respective centering spools, will return the third spool valve to its previously described normal operating condition as depicted in the drawing and the two independent supply systems will again be directly supplying pressurized fluid separately to each of the two working systems.

Further, by a predetermined variation in the relationship of the face areas of the centering spools 64 and 68 to the axial face areas of the extension rods 62 and 66, the third valve can be made to switch from one supply system to the other at a predetermined fluid pressure ratio.

It will be understood that this invention can be modified to adapt it to various circumstances and conditions, and it is accordingly desired to comprehend within the purview of this invention such modifications as may be considered to fall within the scope of the appended claims.

I claim:

1. A selector valve for automatically supplying pressurized fluid from three independent hydraulic systems, one of which is in a standby status, into two working systems, comprising: dual slide valves, each being connected to one of the independent hydraulic systems and jointly connected to the standby system for controlling the flow of pressurized fluid into two working systems; means interconnecting the slide valves and effective when the fluid pressure decreases in one of the independent hydraulic systems supplying a working system for disconnecting said decreased pressure system and activating the standby system into that working system, said dual slide valves further including centering spool means positioned at one end of each slide valve for preventing movement of the valve spool as long as the hydraulic pressure of the independent hydraulic system supplying a centering spool is maintained.

2. A selector valve for automatically supplying pressurized fluid from three independent hydraulic systems, one of which is in a standby status, into two working systems, comprising: dual slide valves, each being connected to one of the independent hydraulic systems and jointly connected to the standby system for controlling the flow of pressurized fluid into two working systems; means interconnecting the slide valves and effective when the fluid pressure decreases in one of the independent hydraulic systems supplying a working system for disconnecting said decreased pressure system and activating the standby system into that working system, said means interconnecting the dual slide valves comprising linkage means pivotally mounted between the dual slide valves and having spring biasing means for resisting pivotal movement thereof, whereby a predetermined pressure differential is required between the independent hydraulic systems connected to the slide valves before the decreased pressure system is disconnected and the standby system activated.

3. A selector valve system for automatically supplying pressurized fluid from three independent hydraulic systems, one of which is in a standby status, into a working system, comprising: a pair of slide valves, each being connected to one of the independent hydraulic systems and jointly connected to the standby system for controlling the flow of pressurized fluid into two working systems; means interconnecting the slide valves and effective when the fluid pressure decreases in one of the independent hydraulic systems supplying a working system for disconnecting said decreased pressure system and activating the standby system into that working system; and a third slide valve means effective when the fluid pressure decreases in one of the remaining two independent hydraulic systems each supplying a working system, for disconnecting said decreased pressure system and dividing the flow of fluid from the remaining pressurized independent hydraulic system into the two working systems.

4. The selector valve system set forth in claim 3 wherein said pair of slide valves further include; centering spool means positioned at one end of each slide valve for preventing movement of the valve spool as long as the hydraulic pressure of the independent hydraulic system supplying a centering spool is maintained.

5. The selector valve system set forth in claim 3 wherein said means interconnecting the pair of slide valves comprises; linkage means pivotally mounted between the pair of slide valves and having spring biasing means for resisting pivotal movement thereof, whereby a predetermined pressure differential is required between the independent hydraulic systems connected to the pair of slide valves before the decreased pressure system is disconnected and the standby system activated.

* * * * *